(12) United States Patent
Cocchi et al.

(10) Patent No.: US 11,134,703 B2
(45) Date of Patent: Oct. 5, 2021

(54) MACHINE FOR MAKING LIQUID AND SEMI-LIQUID FOOD PRODUCTS

(71) Applicant: ALI GROUP S.r.l.—CARPIGIANI, Cernusco Sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco Sul (IT)

( * ) Notice: Subject to any disclaimer, the term of this patent is extended or adjusted under 35 U.S.C. 154(b) by 99 days.

(21) Appl. No.: 16/129,392

(22) Filed: Sep. 12, 2018

(65) Prior Publication Data

US 2019/0075815 A1    Mar. 14, 2019

(30) Foreign Application Priority Data

Sep. 14, 2017   (IT) .................. 202017000103085

(51) Int. Cl.
*A23G 9/28*    (2006.01)
*A23G 9/22*    (2006.01)
*A23G 9/12*    (2006.01)
*A23G 9/04*    (2006.01)

(52) U.S. Cl.
CPC ............. *A23G 9/281* (2013.01); *A23G 9/045* (2013.01); *A23G 9/12* (2013.01); *A23G 9/224* (2013.01); *A23G 9/227* (2013.01)

(58) Field of Classification Search
CPC .......... A23G 9/281; A23G 9/045; A23G 9/12; A23G 9/224; A23G 9/227; A23G 9/225; A23G 9/16; B67D 1/0857; B67D 3/0009
See application file for complete search history.

(56) References Cited

U.S. PATENT DOCUMENTS

| | | | | |
|---|---|---|---|---|
| 2,105,487 A | * | 1/1938 | Lozon | B67D 1/0412 222/5 |
| 3,730,568 A | * | 5/1973 | Giovannetti | F16B 21/16 403/245 |
| 2011/0101039 A1 | * | 5/2011 | Cocchi | A23G 9/28 222/517 |

* cited by examiner

*Primary Examiner* — Tavia Sullens
(74) *Attorney, Agent, or Firm* — Shuttleworth & Ingersoll, PLC; Timothy J. Klima

(57) ABSTRACT

A machine for liquid or semi-liquid food products, including: a container for containing a liquid or semi-liquid food product; a thermal treatment system, equipped with at least one heat exchanger associated with the container for absorbing or releasing heat to the liquid or semi-liquid food product inside the container; a stirrer positioned inside the container; a dispensing device, including: a supporting element having a front wall; an outlet channel, formed in the supporting element and in fluid communication with the container; a shutter which is movable inside the channel between a closed position of the outlet channel and an open position of the outlet channel; a lever having a first end operatively connected to the shutter to allow the movement between the above-mentioned closed position of the outlet channel and the open position of the outlet channel and also having a second end configured for being gripped by a user.

17 Claims, 8 Drawing Sheets

MACHINE FOR MAKING LIQUID AND SEMI-LIQUID FOOD PRODUCTS

This application claims priority to Italian Patent Application IT202017000103085 filed Sep. 14, 2017, the entirety of which is incorporated by reference herein.

BACKGROUND OF THE INVENTION

The invention relates to a machine for making liquid and semi-liquid food products, in particular for products of the ice cream sector.

In the sector in question, there are prior art machines equipped with a processing container, inside of which there is a stirrer.

The product is heat treated in the container, and is extracted by means of a dispenser once it has been made completely.

For this purpose, these machines normally comprise a lever front, which acts on a shutter, positioned inside an outlet channel of the product, to allow the shutter to be moved between a closed position and an open position.

It should be noted that there is a strongly felt need to ensure that the lever can always return to the closed position of the shutter, to guarantee that, following a dispensing, the shutter is always in the closed position and does not disperse the product contained in the container towards the outside.

There are currently various solutions to allow the product outlet channel to be closed, almost automatically.

SUMMARY OF THE INVENTION

The aim of this invention is therefore to provide a machine for making liquid and semi-liquid food products which can form a valid alternative to the currently existing machines and guarantee in a particularly simple and reliable manner the closing of the product outlet channel.

Yet another aim of this invention is to provide a machine for making liquid and semi-liquid food products that can be assembled/disassembled relatively easily, even by not particularly skilled personnel.

This aim is achieved by a machine for making liquid or semi-liquid food products comprising technical features as disclosed herein.

BRIEF DESCRIPTION OF THE DRAWINGS

The technical features of the disclosure, with reference to the above aims, are clearly described in the claims below and its advantages are apparent from the detailed description which follows, with reference to the accompanying drawings which illustrate a preferred, non-limiting example embodiment, and in which:

DESCRIPTION OF THE PREFERRED EMBODIMENTS

Figure 1:
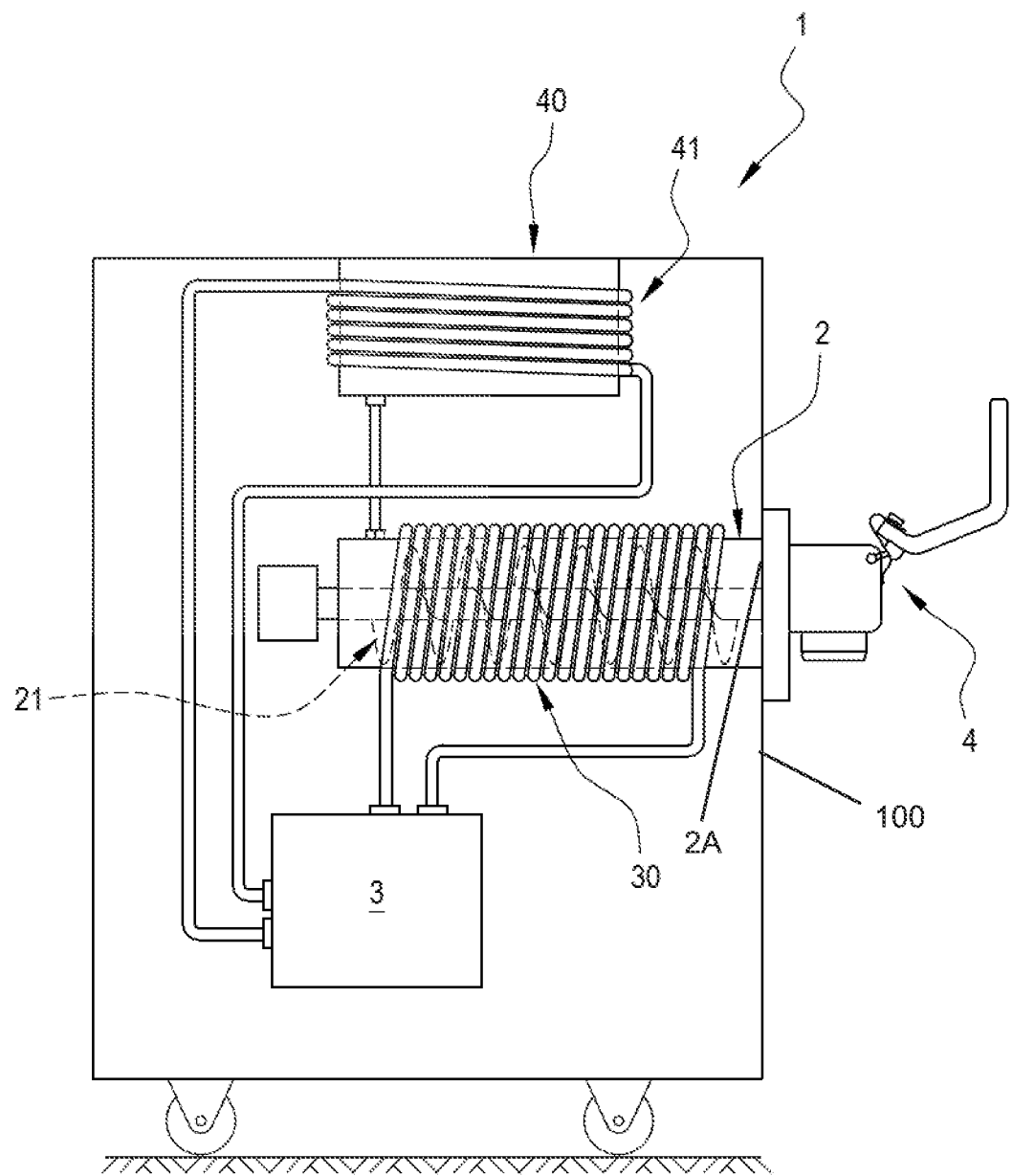
FIG. 1 is a schematic view of a machine according to the invention.
Figure 2:
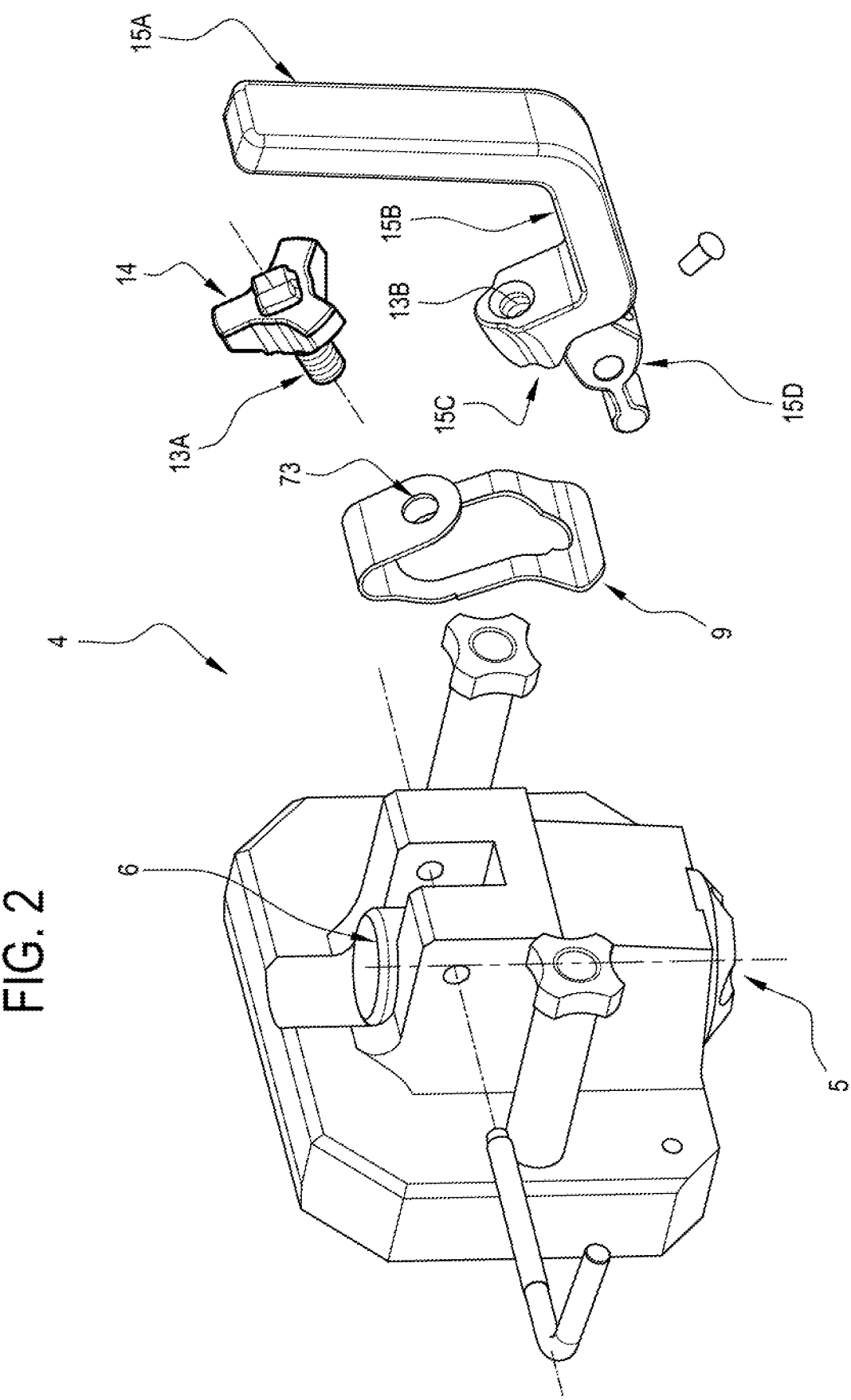
FIGS. 2 to 5 are respective perspective views of a detail of the machine according to the invention according to a first embodiment.
Figure 3:
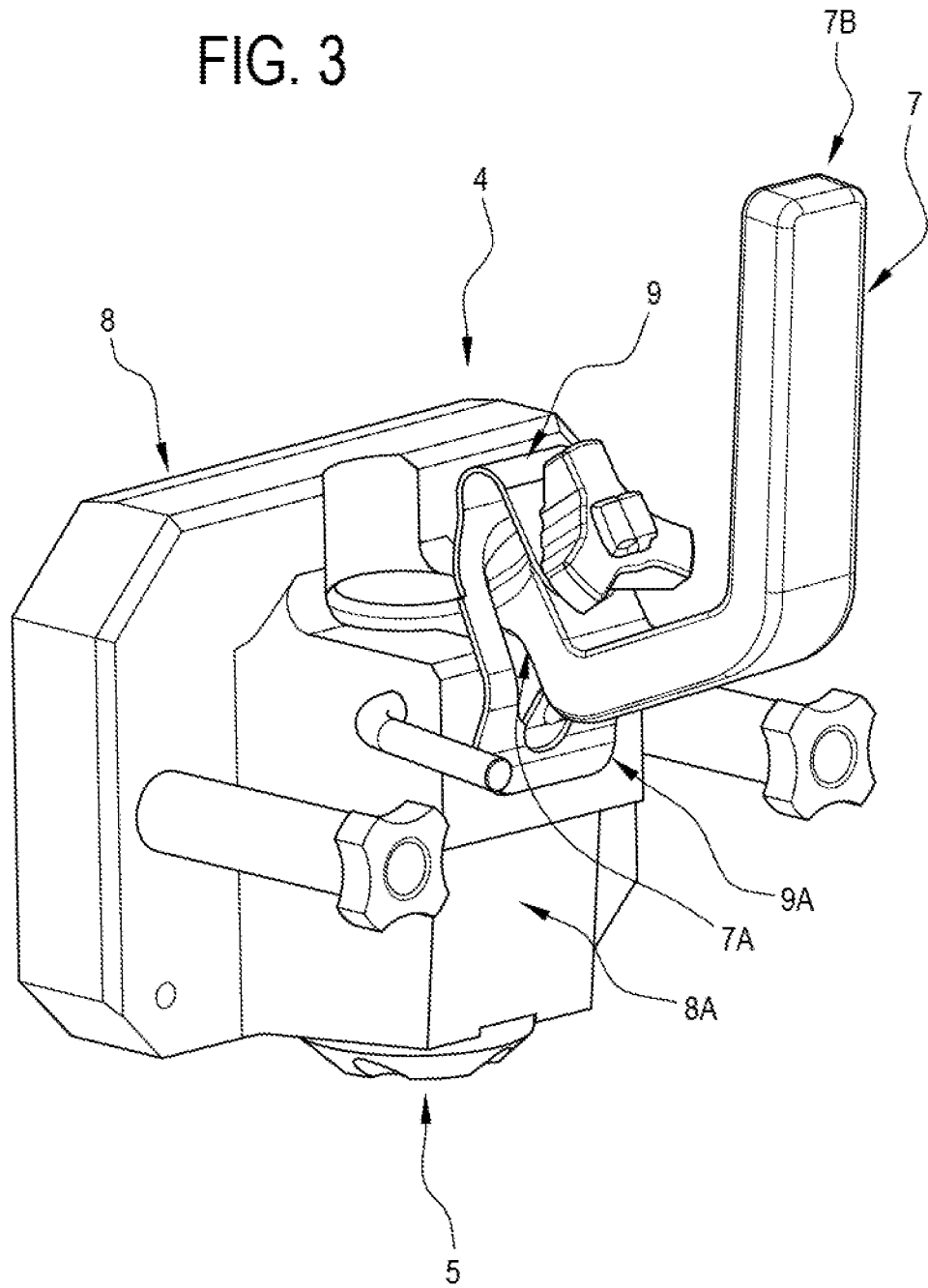
Figure 4:
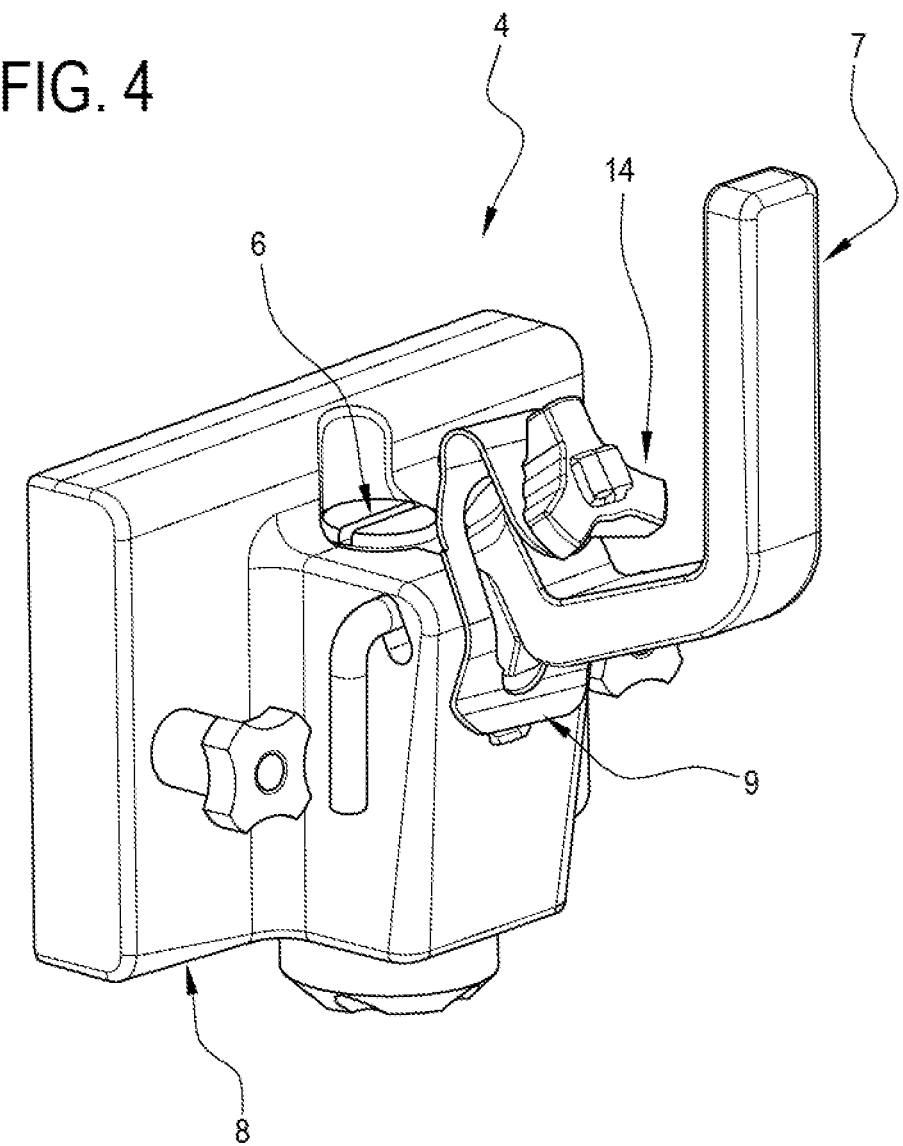
Figure 5:
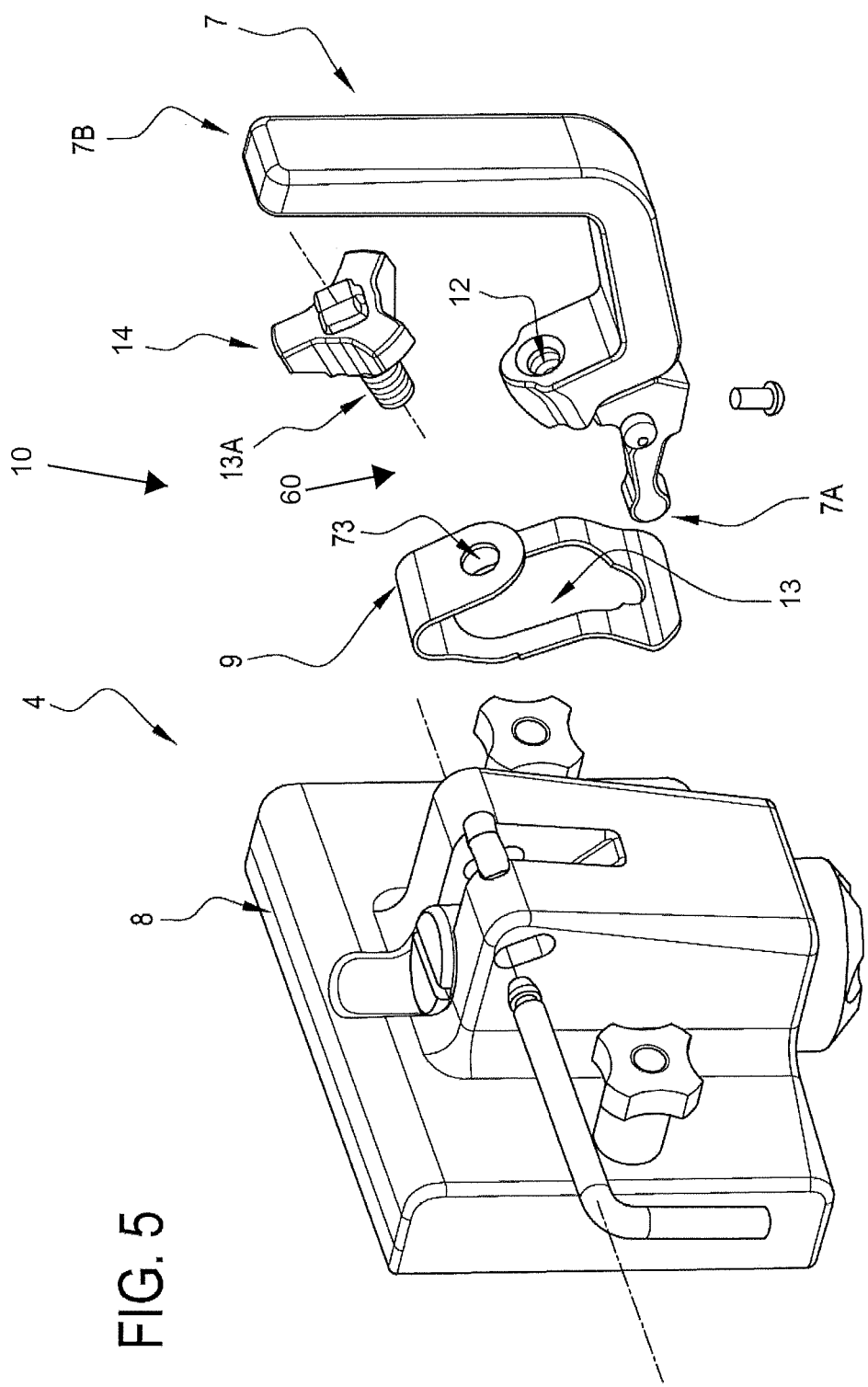
Figure 6:
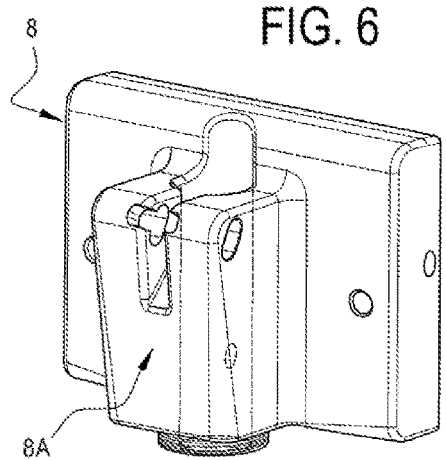
FIG. 6 is a perspective view of a detail from the preceding figures.
Figure 7:
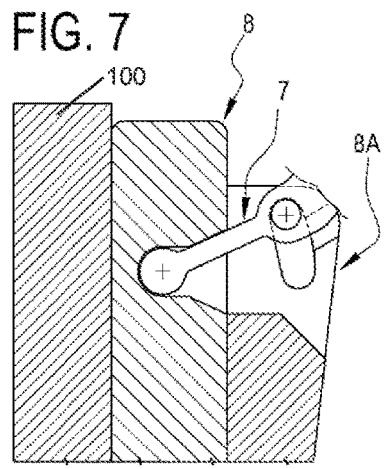
FIG. 7 is a partial cross-section of a detail of the preceding figures.
Figure 8:
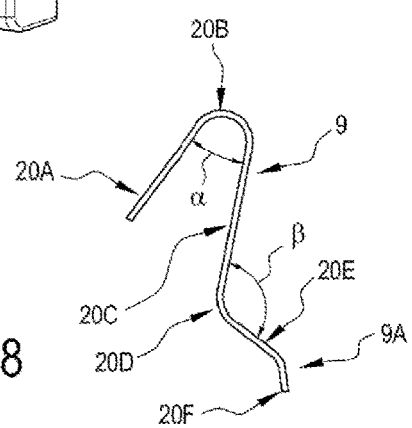
FIG. 8 is a raised side view of a detail of the preceding figures.

With reference to the accompanying drawings, the numeral 1 denotes a machine for liquid and/or semi-liquid food products of the ice cream or pastries or catering sector.

It should be noted that the machine is preferably designed to make ice cream or pastries or catering products.

Products of the ice cream, pastry or catering trade means products such as ice creams (cream, artisan, slush drinks, granitas etc.) or products such as custard, chocolate, or soups.

These products are products which may be served hot or cold.

Preferably, but not necessarily, the machine 1 is an ice cream machine, designed to make ice cream (preferably artisan gelato).

In the context of the invention, the term "ice cream" is used to mean a food preparation based on sugars, milk and milk derivatives, and cream to which fruit, aromatic products or other ingredients are added to obtain different flavors.

The machine 1 comprises:

a container 2 for containing a liquid or semi-liquid food product;

a thermal treatment system 3, equipped with at least one heat exchanger associated with the container 2 for absorbing or releasing heat to the liquid or semi-liquid food product inside the container 2;

a stirrer 21 positioned inside the container 2;

a dispensing device 4, comprising:

a supporting element (dispensing head) 8 having a front wall 8A;

an outlet channel 5, formed in the supporting element 8 and, in use, in fluid communication with the container 2;

a shutter 6 which is movable inside the channel between a closed position of the outlet channel 5 and an open position of the outlet channel 5;

a lever 7 having a first end 7A operatively connected to the shutter 6 to allow the movement (in the outlet channel 5) between the above-mentioned closed position of the outlet channel 5 and the open position of the outlet channel 5 and also having a second end 7B configured for being gripped by a user.

Preferably, the machine 1 comprises an element 9 configured to deform elastically (spring), having an opening 13 through which passes the first end 7A of the lever 7 and having a first end 9A configured to make contact with the front wall 8A of the supporting element 8;

means 10 for coupling the lever 7 to the element 9 (coupling device 10) configured to elastically deform and configured to allow a coupling of the lever 7 relative to the element 9 configured to deform elastically.

The element 9 is shaped like a plate, suitably shaped and having portions angularly positioned relative to each other.

According to one aspect, the coupling device 10 comprises:

a through cavity 12 formed in the lever 7;

a through cavity 13 made in a second end 9B of the element 9 configured to deform elastically;

elements 60 for coupling by screwing, designed to engage the through cavity 12 formed in the lever 7 and the cavity 13 made in a second end 9B of the element 9 for allowing a coupling of the lever 7 with the element 9 configured to deform elastically.

According to another aspect, the elements 60 for coupling by screwing comprise a threaded shank 13A externally and a seat 13B threaded internally designed to couple by screwing with the threaded shank 13A externally.

Preferably, the seat 13B internally threaded is made in the lever 7.

Preferably, the machine 7 comprises a knob 14 in which is made the threaded shank 13A.

The knob comprises a head portion and the threaded shank 13A.

More specifically, according to another aspect, the through cavity 12 formed in the lever 7 defines the above-mentioned seat 13B threaded internally.

Preferably, the threaded shank 13A is configured to extend, in use and once coupled to the seat 13B threaded internally, inside the through cavity 13 made in a second end 9B of the element 9 configured to deform elastically.

The coupling between the threaded shank 13A and the seat 13 makes it possible to keep in position the element 9 relative to the front wall 8A of the supporting element 8.

It should be noted that the supporting element 8 is, in use, fixed to the machine frame 100.

Preferably, the supporting element 8 is, in use, fixed to the machine frame 100 in front of a dispensing opening 2A of the container 2.

Preferably, the container 2 is a cylindrical container.

Preferably, the container 2 has a horizontal axis.

According to another aspect, the lever 7 comprises a first portion 15A, wherein is made the second rectilinear end 7B and a second rectilinear portion 15B connected to the first portion 15A, to which is associated the first end 7A, the first portion 15A and the second rectilinear portion 15B being angularly positioned relative to each other.

According to another aspect, the lever 7 further comprises a third portion 15C, connected to the second rectilinear portion 15B distally relative to the first portion 15A and positioned angularly inclined relative to the second rectilinear portion 15B.

Preferably, the element 9 is designed to make contact with the third portion 15C of the lever 7 (in particular a portion of the element 9 rests on the third portion 15C of the lever 7).

Preferably, the lever 7 further comprises a fourth portion 15D, in which the first end 7A is formed.

Preferably, the first portion 15A and second rectilinear portion 15B together form an angle of between 90° and 180°.

According to another aspect, as illustrated by way of a non-limiting example, the element 9 configured to deform elastically comprises, connected in a sequential manner, a first rectilinear portion 20A, a first curvilinear portion 20B, a second rectilinear portion 20C, a second curvilinear portion 20D, a third rectilinear portion 20E, and a fourth rectilinear portion 20F.

Preferably, the first end 9A configured to make contact with the front wall 8A of the supporting element 8 is made at the third 20E and/or fourth 20F rectilinear portion of the element 9.

According to another aspect, during an actuation of the lever 7 for moving the shutter 6 from the closed position to the open position, the first rectilinear portion 20A is moved towards the second rectilinear portion 20C (preferably so as to reduce a first angle α between the first rectilinear portion 20A and the second rectilinear portion 20C), and the second rectilinear portion 20C is moved away from the third rectilinear portion 20E (preferably so as to increase a second angle β between the second rectilinear portion 20C and the third rectilinear portion 20E).

According to another aspect, the first angle α is an acute angle and the second angle β is an obtuse angle.

According to another aspect, the above-mentioned opening 13 of the element 9 configured to deform elastically is defined at the second rectilinear portion 20C and at the third rectilinear portion 20E.

According to another aspect, the cavity 13 made in a second end 9B of the element 9 configured to deform elastically is made at the first rectilinear portion 20A.

According to another aspect, the outlet channel 5 is cylindrical.

According to another aspect, the outlet channel 5 has a vertical axis.

According to another aspect, the shutter 6 is cylindrical.

It should be noted that the machine 1 allows, advantageously, in a particularly simple manner, the rearrangement of the shutter 6 in the closed position in every condition, after it has been opened.

In effect, the element 9, once it is elastically deformed due to the movement of the lever 7, applies an elastic force which returns the shutter 6 and the lever to the closed position.

Advantageously, according to the solution, it is also possible to remove and refit with relative ease, also for the purpose of cleaning, both the lever 7 and the shutter 6.

The element 9 may be fitted and removed with relative ease.

Some aspects relating to the machine 1 are described below.

It should be noted that the stirrer 21 is designed to be rotated, to allow a mixing inside the container 2 for processing the product being processed.

Preferably, the machine 1 comprises an actuator (drive motor) to drive the stirrer 21 in rotation.

Preferably, the machine 1 comprises a heat exchanger 30, wound in the form of a coil on the walls of the container 2 (cylindrical) and forming part of the thermal treatment system 3.

Preferably, the thermal treatment system 3 is a system of the thermodynamic type.

Preferably, the thermal treatment system 3 comprises a hydraulic circuit, inside of which a thermal carrier liquid circulates.

Preferably, the thermal treatment system 3 comprises a compressor.

Preferably, the thermal treatment system 3 comprises a pressure reducing element.

Preferably, the thermal treatment system 3 comprises a further heat exchanger, which is different from the heat exchanger 30.

The mixing and (simultaneous) thermal treatment step (cooling) is carried out inside the processing container 2 so as to convert the basic preparation, if necessary diluted with a dilution liquid, into the finished product (for example, an ice cream type product).

It should be noted that during the stirring and (simultaneous) thermal treatment step, the basic preparation P (if necessary diluted with the dilution liquid) is preferably thermally treated (in particular in the case of an ice cream type product) at a temperature between −15° C. and −2° C.

For this reason, the thermal treatment system (cooling) 3 is preferably configured to cool the basic preparation (diluted with the dilution liquid) inside the container 2, down to a temperature of between −15° C. and −2° C. and, more preferably, between −13° C. and −3° C.

Further, preferably, the machine 1 comprises a control and drive unit configured to regulate the thermal treatment system 3 (chiller) in such a way as to allow a cooling of the food mixture being processed, inside the container 2, in a range of between −15° C. and −2° C., more preferably, between −13° C. and −3° C.

It should be noted that preferably the heat exchanger 30 associated with the container 2, in cooling during normal use, acts as an evaporator.

Preferably, the thermal treatment system 3 is configured to operate according to a thermodynamic cycle, preferably a vapour compression thermodynamic cycle.

It should be noted that, as illustrated in FIG. 1, the machine 1 may comprise a further container 40, designed to allow a preparation of the product before it is fed into the container 2. A pasteurization treatment, for example, may be carried out inside the further container 40.

Preferably, the machine 1 comprises a further heat exchanger 41, associated with the further container 40.

Preferably, the further heat exchanger 41 forms part of the thermal treatment system 3.

Described below is a further embodiment of the dispensing device 4, as shown in FIGS. 9 to 12.

It should be noted that in this case the lever 7 is made in two portions, 70A and 70B. The two portions 70A, 70B are removably coupled to each other.

More specifically, the lever 7 comprises a first portion, 70A, at which there is the first end 7A of the lever.

The lever 7 also comprises a second portion 70B designed to be gripped by a user and at which the second end 7B of the lever is present.

The two portions, 70A, 70B, are removably coupled to each other, in particular they can be coupled by screwing.

More specifically, it should be noted that in the embodiment illustrated, one between the first portion 70A and the second portion 70B is equipped with a protrusion 71 threaded externally, whilst the other between the first portion 70A and the second portion 70B is equipped with a cavity 72 threaded internally.

The cavity 72 and the protrusion 71 are configured to be coupled to each other by screwing.

The coupling between the first portion 70A and the second portion 70B occurs by means of the coupling, by screwing, between the protrusion 71 and the cavity 72.

In the embodiment illustrated, the protrusion 71 passes through a hole 73 provided in the element 9 configured to deform elastically.

More specifically, the elastic element 9 has the hole 73 in the portion 20A.

Figure 9:
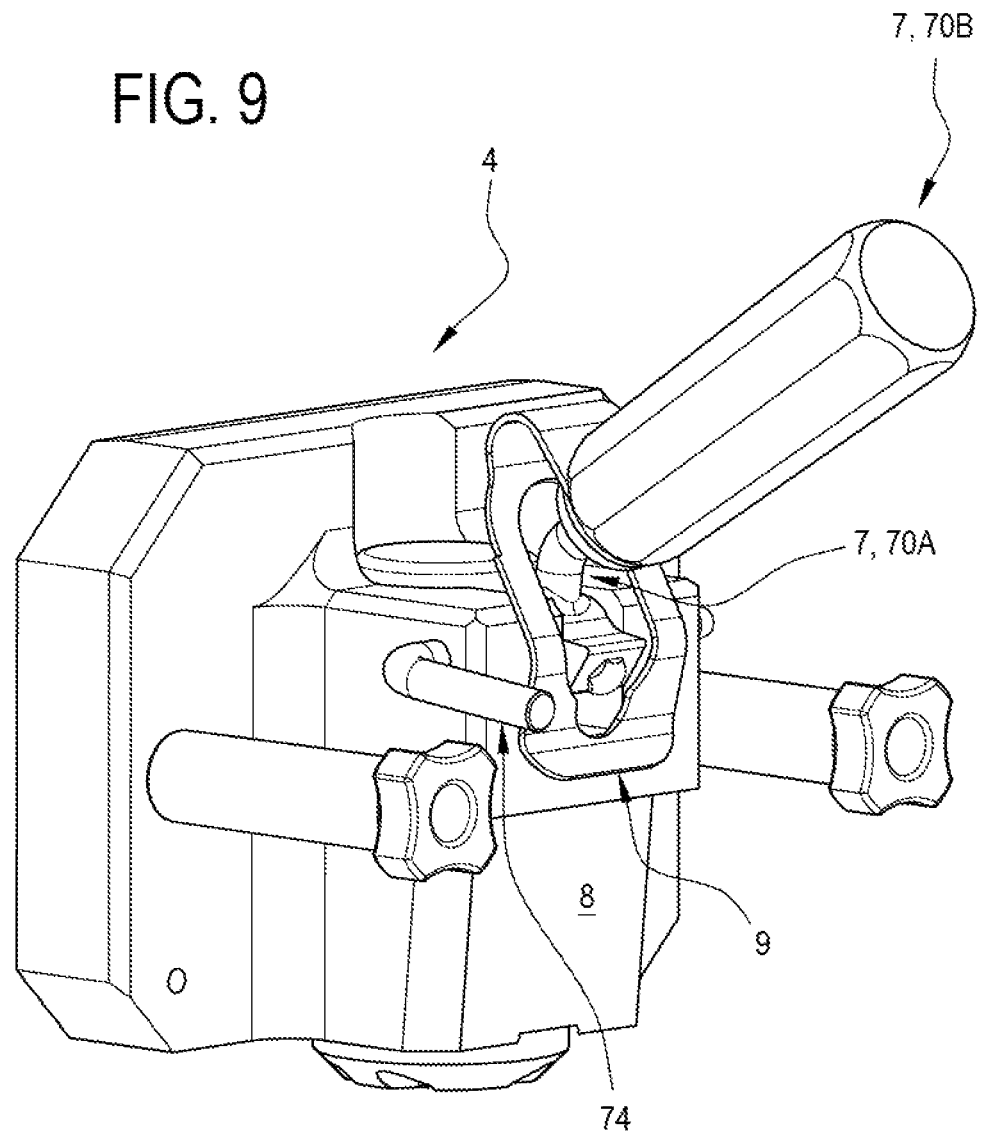
FIG. 9 is a perspective view of a detail of the machine according to the invention according to a second embodiment.
Figure 10:
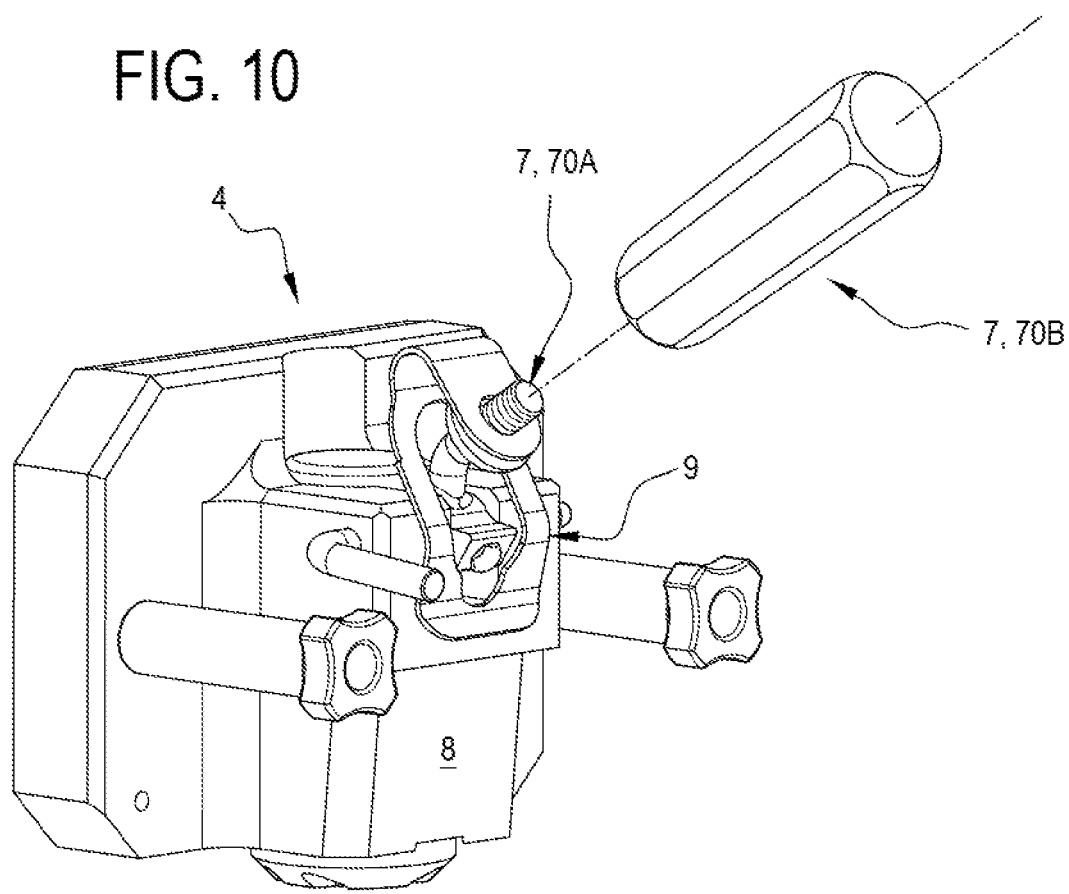
FIG. 10 is an exploded perspective view of the detail of the machine according to the invention illustrated in FIG. 9.
Figure 11:
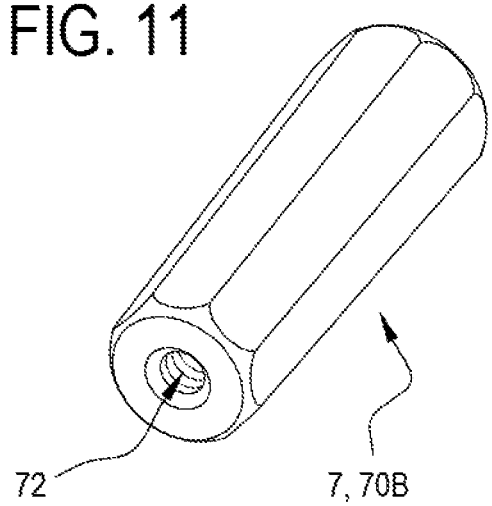
FIGS. 11 and 12 are respective perspective views of details of FIGS. 9 and 10.
Figure 12:
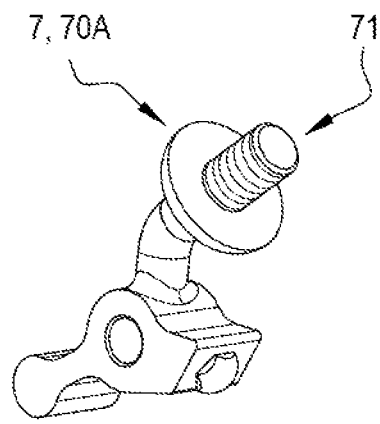

It should be noted that, in the embodiment of FIGS. 9 and 10, the portion 70B abuts on the portion 20A of the spring, and the protrusion 71 passes through the hole 73 to be inserted in the cavity 72.

The portion 70A is hinged to the supporting element 8 (and operatively connected to the shutter 6).

More specifically, the dispensing device 4 comprises a pin 74 and the portion 70A and the supporting element 8 have respective holes, which are, in use, engaged in the pin 74.

The pin 74 makes it possible to removably constrain, in a rotatable fashion, the portion 70A to the supporting element 8.

Preferably, whatever the specific embodiment, the elastic element 9 is made of a metallic material.

What is claimed is:

1. A machine for liquid or semi-liquid food products, comprising:
a frame;
a container for containing a liquid or semi-liquid food product, the container positioned in the frame and including a dispensing opening;
a thermal treatment system, including a heat exchanger thermally connected to the container for absorbing or releasing heat to the liquid or semi-liquid food product inside the container;
a stirrer positioned inside the container;
a dispensing device, comprising:
a dispensing head for closing an opening in the container, the dispensing head positioned adjacent the dispensing opening to close off the dispensing opening, the dispensing head including a front wall and an outlet channel formed in the dispensing head and in fluid communication with the container via the dispensing opening;
a shutter which is movable inside the outlet channel between a closed position of the outlet channel and an open position of the outlet channel;
a lever having a first end operatively connected to the shutter to allow the movement between the closed position of the outlet channel and the open position of the outlet channel and also having a second end configured for being gripped by a user;
a spring configured to deform elastically, the spring including at least one cavity through which passes the first end of the lever, the spring having a first end configured to make contact with the front wall of the dispensing head, the spring comprising:
in profile, connected in a sequential manner, a first rectilinear portion, a first curvilinear portion, a second rectilinear portion, a second curvilinear portion, a third rectilinear portion, and a fourth rectilinear portion, the first end configured to contact the front wall of the dispensing head at at least one chosen from the third rectilinear portion and the fourth rectilinear portion;
a first angle between the first rectilinear portion and the second rectilinear portion and a second angle between the second rectilinear portion and the third rectilinear portion; wherein during an actuation of the lever for moving the shutter from the closed position to the open position, the first rectilinear portion is moved towards the second rectilinear portion, so as to reduce the first angle, and the second rectilinear portion is moved away from the third rectilinear portion so as to increase the second angle;
a coupling device coupling the lever relative to the spring, comprising:
a cavity formed in the lever;
a threaded fastener including a threaded shank configured to engage the cavity formed in the lever and pass through the at least one cavity in the spring for coupling the lever relative to the spring.

2. The machine according to claim 1, wherein the shutter is cylindrical.

3. The machine according to claim 1, wherein the outlet channel is cylindrical.

4. The machine according to claim 1, wherein the first angle is an acute angle and the second angle is an obtuse angle.

5. The machine according to claim 1, wherein the at least one cavity includes a first cavity positioned at the second rectilinear portion and at the third rectilinear portion.

6. The machine according to claim 1, wherein the at least one cavity includes a second cavity positioned at the first rectilinear portion.

7. The machine according to claim 1, wherein the cavity formed in the lever includes an internally threaded seat.

8. The machine according to claim 7, and further comprising a knob attached to the threaded fastener, the knob for manipulation by the user.

9. The machine according to claim 7, wherein the externally threaded shank is configured to extend, in use and once coupled to the internally threaded seat, inside the cavity formed in the lever.

10. The machine according to claim 1, wherein the lever comprises a a first portion positioned at the second end and a second rectilinear portion connected to the first portion, the first portion including a free end and an opposite connected end, the second rectilinear portion connected to the connected end, the first portion and the second rectilinear portion being angularly positioned relative to each other.

11. The machine according to claim 10, wherein the first portion and the second rectilinear portion form between them an angle of between 90° and 180°.

12. The machine according to claim 10, wherein the lever further comprises a third portion connected to the second rectilinear portion distally relative to the first portion, the third portion being angularly inclined relative to the second rectilinear portion.

13. The machine according to claim 12, wherein the spring is configured to contact the third portion of the lever.

14. The machine according to claim 12, wherein the lever further comprises a fourth portion connected to the third portion and positioned at the first end.

15. The machine according to claim 1, wherein the lever comprises:
a first end and an opposite second end;
a first portion positioned at the first end of the lever;
a second portion positioned at the second end and configured to be gripped by a user,
wherein, the first and second portions are removably coupled to each other.

16. The machine according to claim 15, wherein the first and second portions of the lever are removably coupled to each other with a threaded connection.

17. The machine according to claim 15, wherein the first portion includes an externally threaded protrusion and the second portion includes an internally threaded cavity configured to threadingly engage the externally threaded protrusion.

* * * * *